United States Patent Office 3,106,530
Patented Oct. 8, 1963

3,106,530
FIRE EXTINGUISHING AGENTS
David N. Glew, Sarnia, Ontario, Canada, assignor to The Dow Chemical Company, Midland, Mich., a corporation of Delaware
No Drawing. Filed July 25, 1960, Ser. No. 44,894
12 Claims. (Cl. 252—8)

This invention relates to fire extinguishing agents, as new compositions of matter, which are emulsified sludges of halogenated methane hydrates, to methods for preparing these emulsified sludges, and to a method for extinguishing fires employing said sludges.

The compositions of matter of the present invention contain, as one component, halogenated methane hydrates which are hydrated forms of a halomethane having a molecular weight above about 100 and containing at least 3 halogen atoms in the molecule, at least one being fluorine and none of the halogens having an atomic weight above 80. These hydrates contain about seventeen molecules of water of crystallization; for example, dibromodifluoromethane hydrate and bromochlorodifluoromethane hydrate have the respective formulae of $CBr_2F_2 \cdot 17H_2O$ and $CBrClF_2 \cdot 17H_2O$. Other components of the emulsified sludges are either water or the liquid halogenated methane and an emulsifying agent.

It is known in the art that dibromodifluoromethane and bromochlorodifluoromethane, as pure liquids, are efficient, non-toxic fire extinguishing agents. However, their low boiling points of 23° C. and —4° C., respectively, and their low heats of vaporization of 6260 calories per mole or 5530 calories per mole, respectively, prevent their adequate projection over distances of greater than 10 to 20 feet. Thus, it has not been possible to employ these compounds, as pure liquids, for fighting large fires over longer distances, such as, for example, fires occurring in large burning aircraft, where the radius of conflagration can extend up to 100 feet and where the minimum radius of approach can be as great as 150 feet.

The object of the present invention is to provide stabilized forms of the halogenated methanes that can be projected an appreciably greater distance than the pure liquids, such stabilized forms of the extinguishing agents preferably having decomposition products of low toxicity and retaining the efficient extinguishing properties of the pure liquids.

The halogenated methane hydrates are solid compounds containing the halogenated methane entrapped in a water lattice. Above a certain temperature, referred to as the "hydrate critical temperature," the solid becomes unstable and decomposes into its components, i.e., water and extinguishant, with the absorption of a large quantity of heat. Below the "hydrate critical temperature," the hydrate possesses greater stability than a mixture of its liquid components, and below 0° C. the hydrate is more stable than the ice-liquid extinguishant system. The advantages conferred by these properties of the hydrates over the pure organic liquids and which are utilized in the present invention are those of greater projectibility due to lower vapor pressure of the extinguishant, and a greater cooling effect obtained upon use of the hydrate in fire-fighting due to the heat of decomposition of the hydrate.

However, the halogenated methane hydrates, as such, are impractical for use as fire extinguishing agents because they form solid crystal masses, thus making the pumping of them extremely difficult. This difficulty is overcome by incorporating them into an emulsified sludge system having the solid hydrate as the dispersed phase in a continuous phase of either water or liquid halogenated methane.

The halomethanes useful in the invention are those having a molecular weight above about 100 and containing at least 3 halogen atoms in the molecule, at least one being fluorine and none of the halogens having an atomic weight above 80.

The description which follows relates to the preparation of the hydrates of halomethanes of the above-defined class, discussion of their properties pertinent to the present invention, and the preparation of the emulsified sludges.

The preparation of the hydrates employed in the present invention is illustrated by Examples 1 and 2.

EXAMPLE 1

The hydrate $CBrClF_2 \cdot 17H_2O$ was prepared by bubbing ice in liquid dibromodifluoromethane at 0° C. Alternatively, the hydrate was produced from a mixture of liquid $CBr_2F_2$ and liquid water maintained at 0° C. by seeding the system with a small amount of ice; the hydrate then formed rapidly with evolution of heat.

EXAMPLE 2

The hydrate $CBrClF_2 \cdot 17H_2O$ was prepared by bubbling gaseous bromochlorodifluoromethane through a sintered disc in an ice-water mixture at 0° C. Also, the hydrate was prepared by adding ice to liquid $CBrClF_2$ cooled to —4° C.

Vapor pressures have been measured for the pure liquids and for the hydrates at the same temperatures. These vapor pressures are shown in Table I for $CBr_2F_2$, $CBrClF_2$, and $CBrF_3$, in addition to the ratios of the vapor pressure of the pure liquid to that of the hydrate (p liquid/p hydrate), and the "hydrate critical temperature" (C.T.).

*Table I*

$CBr_2F_2$

| $t$ (° C.) | p hydrate (mm. Hg) | p liquid (mm. Hg) | p liquid/ p hydrate |
|---|---|---|---|
| 4.6(C.T.) | 378 | 378 | 1.00 |
| 0 | 133 | 312 | 2.34 |

$CBrClF_2$

| $t$ (° C.) | p hydrate (mm. Hg) | p liquid (mm. Hg) | p liquid/ p hydrate |
|---|---|---|---|
| 10.0(C.T.) | 1,263 | 1,263 | 1.00 |
| 5.0 | 421 | 1,062 | 2.52 |
| 0 | 139 | 882 | 6.34 |
| —10 | 77.5 | 598 | 7.72 |
| —20 | 41.6 | 392 | 9.42 |

$CBrF_3$

| $t$ (° C.) | p hydrate (mm. Hg) | p liquid (mm. Hg) | p liquid/ p hydrate |
|---|---|---|---|
| 12.1(C.T.) | 8,710 | 8,710 | 1.00 |
| 10.0 | 5,637 | 8,295 | 1.47 |
| 5.0 | 1,906 | 7,210 | 3.78 |
| 0 | 628 | 6,340 | 10.10 |
| —10 | 380 | 4,670 | 12.30 |
| —20 | 221 | 3,420 | 15.50 |

Values of greater than 1.00 for p liquid/p hydrate represent stabilization of the hydrate system as compared with that of the pure liquid.

It is seen in the above examples that at 0° C. the vapor pressures of the halomethanes have been substantially lowered by employing a hydrate-liquid system in place of the pure liquid. Consequently, direct losses due to evaporation of the extinguishant are lessened.

The halogenated methane hydrates will decompose into their components at 0° C. in varying physical states, according to the thermochemical equations:

$$\text{(I)} \quad CX_4 \cdot 17H_2O \text{ (solid)} \xrightarrow{\Delta H'} 17H_2O \text{ (liquid)} + CX_4 \text{ (liquid)}$$

$$\text{(II)} \quad CX_4 \cdot 17H_2O \text{ (solid)} \xrightarrow{\Delta H_2} 17H_2O \text{ (liquid)} + CX_4 \text{ (gas)}$$

$$\text{(III)} \quad CX_4 \cdot 17H_2O \text{ (solid)} \xrightarrow{\Delta H_3} 17H_2O \text{ (gas)} + CX_4 \text{ (gas)}$$

The amount of heat required to decompose the hydrates of dibromodifluoromethane, bromochlorodifluoromethane, and bromotrifluoromethane into pure halogenated methane vapor and water vapor, at 0° C., according to Equation III above is shown in Table II, in addition to the heat of vaporization for the pure liquids, and the ratio of the heat of vaporization of the hydrates to that of the pure halogenated methanes.

Table II

| Halomethane | $\Delta H_3$ Hydrate cal./mole | $\Delta H$ Liquid cal./mole | Ratio, $\Delta H_3 / \Delta H$ |
|---|---|---|---|
| $CBr_2F_2$ | 206,340 | 6,260 | 33.0 |
| $CBrClF_2$ | 205,740 | 5,530 | 37.2 |
| $CBrF_3$ | 204,740 | 3,420 | 59.9 |

It is easily seen that a considerably greater amount of heat is required to vaporize the hydrates as compared with the pure extinguishant liquids. When the hydrates are heated to their critical temperatures, they will decompose into mixtures of water and liquid (or vaporized) extinguishant. When used as extinguishing agents, the heat required for this decomposition will lower the flame temperature; also, if the liquid water is vaporized further cooling is effected.

The prepartaion of the emulsified sludges of the present invention is illustrated by the following examples.

EXAMPLE 3

The emulsified sludges of which the organic hydrates are a component are typically comprised of water or liquid organic extinguishing agent and an emulsifying agent, in addition to the hydrate. By way of example, a sludge of a hydrate dispersed in liquid extinguishant was prepared as follows:

Twenty (20) grams of crushed ice were added to 150 milliliters (350 grams) of liquid dibromodifluoromethane at −10° C. The hydrate formed rapidly after shaking of the mixture at this temperature. To this mixture was added 0.5 ml. of triethanolamine which dissolved rapidly with brief shaking, after which 1.0 gram of oleic acid was added. After shaking once more, the mixture was placed in a refrigerator maintained at 2° C. and allowed to remain for four hours with periodic shaking. The mixture was then allowed to remain refrigerated at 2° C. for four days without further shaking. There was no visible evidence of phase separation at the end of the four-day storage period, the sludge appearing as a viscous, creamy substance.

EXAMPLE 4

A sludge of a hydrate dispersed in water was prepared as follows:

Fifteen (15) ml. of liquid dibromodifluoromethane at 2° C. were added to 150 ml. of an ice-water mixture. The hydrate was emulsified by adding 0.75 gram of triethanolamine and 1.5 grams of oleic acid, and shaking the mixture briefly after adding each component. After storage for two days at 2° C., there were no visible signs of phase separation.

The above examples described the formualtion of the hydrate sludges wherein the hydrate is formed prior to emulsification. Alternatively, an emulsion system can be formed at about room temperature from water, organic liquid, and emulsifying agent, and the hydrate sludge formed by chilling the system.

EXAMPLE 5

A sludge of dibromodifluoromethane was prepared from the following formulation:

25 parts by weight of water
175 parts by weight of dibromodifluoromethane
0.4 part by weight of triethanolamine
1.0 part by weight oleic acid The triethanolamine was dissolved in water and the oleic acid dissolved in the dibromodifluoromethane. The dibromodifluoromethane solution was then put into a Waring Blendor running at low speed and the aqueous solution added slowly, resulting in the formation of a white, creamy emulsion within one minute. The emulsion was then kept at −28° C. for two hours with occasional shaking. The mixture was then stored at 2° C. for four days, during which time there was no evidence of phase separation. The sludge appeared as a viscous, creamy substance.

Emulsified sludges of bromochlorodifluoromethane or bromotrichloromethane can be prepared in a manner similar to that described above. The sludges dispersed in liquid extinguishant are the preferred compositions of the present invention as they contain a larger proportion of liquid extinguishant than the sluges dispersed in water and, thus, are considered to be more effective as fire extinguishing agents. Preferably, such sludge compositions contain from about 5 percent to about 30 percent of water, by weight, and from about 95 percent to about 70 percent of organic extinguishant; desirably, the proportions are about 25 percent water by weight and about 75 percent by weight of organic extinguishant. The sludges dispersed in water contain from about 5 percent to about 25 percent of organic extinguishant, by weight, and from about 95 percent to about 75 percent of water.

The organic hydrates and liquid extinguishing agents specifically disclosed in the examples herein are those of dibromodifluoromethane, bromochlorodifluoromethane and bromotrifluoromethane; however, other liquid extinguishing agents and analogous hydrates derived therefrom which are within the scope of the present invention and are usable in the same manner include dichlorodifluoromethane, trichlorofluoromethane, and bromodifluoromethane or any mixtures of these components and their mixed hydrates.

Triethanolamine oleate was the emulsifying agent employed in the hereinbefore cited examples. However, any suitable emulsifying agent may be used. Examples of operable emulsifying agents are sodium lignin sulfonate, sodium dioctylsulphosuccinate, lauryl diethanolamide, and alkylphenyl ethers of polyalkylene glycols, such as, for example, octylphenyl polyethylene glycol, decylphenyl polyethylene glycol, hexylphenyl polypropylene glycol, octylphenyl polypropylene glycol, hexylphenyl polyethylene glycol, heptylphenyl polyethylene glycol, heptylphenyl polypropylene glycol.

As a fire extinguishing agent, the hydrate sludge has a lower density than the pure organic liquid extinguishants and, thus, will project farther under a given pumping pressure. The hydrate sludge has a larger heat of decomposition than the pure liquid extinguishants and, thus, will exert a greater cooling effect on the fire. Also, upon heating, the aqueous emulsified sludge produces copious amounts of bubbles or foam containing vaporized liquid extinguishant which is stable and has good covering power, thus furnishing additional value as a fire extinguishing agent.

Various modifications may be made in the method of the present invention without departing from the spirit or scope thereof, and it is to be understood that I limit myself only as defined in the appended claims.

The embodiments of the invention in which an exclusive property or privilege is claimed are defined as follows:

1. As a composition of matter, a fluid emulsion consisting essentially of a continuous fluid phase, a solid dispersed phase and an emulsifying agent, said solid phase consisting essentially of a crystalline hydrate of a halomethane and said fluid phase consisting essentially of a fluid selected from the group consisting of water and the halomethane, said halomethane being one having a molecular weight above about 100 and containing at least 3 halogen atoms in each molecule, said halogen atoms having an atomic weight below 80 and at least one of them being fluorine; the fluid emulsion consisting of from about 5 to 30 weight percent of water and from about 70 to 95 weight percent of the halomethane when the continuous phase is the halomethane, and from about 5 to 25 weight percent of the halomethane and from about 75 to 95 weight percent of water when the continuous phase is water.

2. A composition as in claim 1 wherein the continuous fluid phase is water.

3. A composition as in claim 1 wherein the continuous fluid phase is the halomethane.

4. A composition of matter as in claim 1, wherein the halomethane is dibromodifluoromethane.

5. A composition of matter as in claim 1, wherein the halomethane is bromochlorodifluoromethane.

6. A composition of matter as in claim 1, wherein the halomethane is bromotrifluoromethane.

7. A method for preparing emulsified halogenated methane hydrate sludges, comprising, agitating, at about 2° C. from about 5 to about 25 percent by weight of a halomethane as defined in claim 1 with from about 75 percent to about 95 percent of water and an emulsifying agent, and agitating the mixture sufficiently to produce a homogeneous emulsion system.

8. A method for preparing emulsified halogenated methane hydrate sludges, comprising, agitating, at about room temperature, from about 5 to about 25 percent by weight of a halomethane as defined in claim 1 with from about 75 percent to about 95 percent of water, and an emulsifying agent, and cooling the resulting emulsion system to about 2° C. after homogenization.

9. A method for extinguishing fires comprising contacting the fire, in an amount sufficient to extinguish the fire, with the fluid emulsion composition as defined in claim 1, the emulsion being applied to the fire with the halomethane in the hydrate form.

10. A method for extinguishing fires as in claim 9, wherein the halogenated methane in the fluid emulsion composition is dibromodifluoromethane, the emulsion being applied to the fire with the halomethane in the hydrate form.

11. A method for extinguishing fires as in claim 9, wherein the halogenated methane in the fluid emulsion composition is bromochlorodifluoromethane, the emulsion being applied to the fire with the halomethane in the hydrate form.

12. A method for extinguishing fires as in claim 9, wherein the halogenated methane in the fluid emulsion composition is bromotrifluoromethane, the emulsion being applied to the fire with the halomethane in the hydrate form.

References Cited in the file of this patent

UNITED STATES PATENTS

| | | |
|---|---|---|
| 2,375,559 | Hutchinson et al. | May 8, 1945 |
| 2,410,583 | Hutchinson | Nov. 5, 1946 |
| 2,745,808 | Roe | May 15, 1956 |
| 2,837,891 | Stasiak | June 10, 1958 |

UNITED STATES PATENT OFFICE
CERTIFICATE OF CORRECTION

Patent No. 3,106,530                          October 8, 1963

David N. Glew

It is hereby certified that error appears in the above numbered patent requiring correction and that the said Letters Patent should read as corrected below.

Column 2, line 13, for the formula "$CBrClF_2 \cdot 17H_2O$" read -- $CBr_2F_2 \cdot 17H_2O$ --; same column 2, lines 13 and 14, for "bubing" read -- suspending --.

Signed and sealed this 21st day of April 1964.

(SEAL)
Attest:

ERNEST W. SWIDER
Attesting Officer

EDWARD J. BRENNER
Commissioner of Patents